United States Patent
Angerfors

[19]

[11] Patent Number: 6,073,732
[45] Date of Patent: Jun. 13, 2000

[54] DISC BRAKE DEVICE FOR MOTOR VEHICLES

[75] Inventor: Dan Angerfors, Floda, Sweden

[73] Assignee: AB Volvo, Sweden

[21] Appl. No.: 09/051,062

[22] PCT Filed: Oct. 2, 1996

[86] PCT No.: PCT/SE96/01241

§ 371 Date: Jul. 7, 1998

§ 102(e) Date: Jul. 7, 1998

[87] PCT Pub. No.: WO97/13078

PCT Pub. Date: Apr. 10, 1997

[30] Foreign Application Priority Data

Oct. 2, 1995 [SE] Sweden .................................. 9503378

[51] Int. Cl.[7] ................................................. F16D 65/095
[52] U.S. Cl. ..................................... 188/71.9; 188/250 D; 188/250 E
[58] Field of Search ................................. 188/71.9, 72.8, 188/196, 250 B, 250 E, 250 F, 250 G, 250 R, 73.1

[56] References Cited

U.S. PATENT DOCUMENTS

| | | | |
|---|---|---|---|
| 3,042,152 | 7/1962 | Butler | 188/250 F |
| 3,114,436 | 12/1963 | Larson | 188/72.8 |
| 3,162,271 | 12/1964 | Hanson | 188/250 F |
| 3,800,920 | 4/1974 | Warwick | 188/250 B |
| 3,887,044 | 6/1975 | Burgdorf et al. | 188/250 G |
| 3,952,844 | 4/1976 | Newstead et al. | 188/72.8 |
| 4,355,708 | 10/1982 | Papagni | 188/71.9 |
| 4,615,417 | 10/1986 | Schneider et al. | 188/250 G |
| 5,123,505 | 6/1992 | Antony | 188/71.9 |
| 5,722,516 | 3/1998 | Forni et al. | 188/71.9 |

FOREIGN PATENT DOCUMENTS

| | | |
|---|---|---|
| 0 336 465 A1 | 10/1989 | European Pat. Off. . |
| 1125875 | 11/1956 | France . |
| 1172934 | 2/1959 | France . |
| 1425240 | 3/1969 | Germany . |

*Primary Examiner*—Chris Schwartz
*Attorney, Agent, or Firm*—Lerner, David, Littenberg, Krumholz & Mentlik, LLP

[57] ABSTRACT

A disc brake arrangement for motor vehicles is disclosed which comprises at least two brake pads (4,5) supported by a brake yoke (1), one side of said pads exhibiting a friction surface (11), which is arranged to face towards a rotatable brake disc (3). In a vehicle braking position, each brake unit is brought to an active position by means of two actuators (8,9) which act against the second side (10) of said brake unit. Thereby, each actuator exhibits an end portion (21) which is intended to transfer movement of the actuators from each respective second side of the brake pad to each respective brake pad. On the second side, each brake pad exhibits a first coupling member (27,28), arranged for each actuator. The end portions of the actuators exhibit second coupling members (37,38) for positioning of the brake pads. Both the first and the second coupling members (27,28,37, 38) exhibit interacting guiding surfaces, which prevent rotation of the end portion (21) of the actuators (8,9) around an axis, transverse to the second side.

6 Claims, 3 Drawing Sheets

DISC BRAKE DEVICE FOR MOTOR VEHICLES

TECHNICAL FIELD

The present invention relates to a disc brake arrangement for motor vehicles, according to the preamble of claim 1.

BACKGROUND OF THE INVENTION

In the brake yoke of disc brakes, the brake pad units are normally supported in such a way within a space, that they are prevented from rotating together with the brake disc. When the brake pad unit has worn down and the brake disc at the same time has been reduced in thickness, it may, however, occur that the brake pad unit, when almost completely worn out, slips out of its position and rotates with the disc. This may imply that the braking function is completely lost or that a complete locking of the brake disc occurs. In certain vehicles, transverse pins are provided which extend through holes, in the brake pad unit and keeps the unit in position. This construction may, however, gradually corrode and as time goes by imply jamming which, when bigger dimensions are concerned such as with disc brakes for heavy vehicles, may result in difficulties during maintenance.

One problem which is associated with a commonly occurring brake system for heavy vehicles is that the actuators, which diplace the brake pad units between braking and released position, exhibit portions at their ends which in certain conditions, e.g. when adjusting for the gradual wear of the brake pad units, are affected by torsional forces, which may cause damage to e.g. enclosing bellows and the like.

From the U.S. Pat. No. 3,162,271, it is previously known to arrange coupling means, between actuators and brake pad units in the form of T-shaped grooves and correponding pins on the actuators intended to interact with the grooves. By means of this interaction, a mutual transfer of the relative position of the actuators and the brake pad units is ensured, for instance by means of the brake pad units being brought to a released position by means of the return movement of the actuators. Since the pins, however, are completely rotationally symmetric, the end portions of the actuators will not become locked against rotation by means of the brake pad units. Consequently, this does not offer any solution to the above-mentioned problem.

SUMMARY OF THE INVENTION

The object of the present invention is to provide a device by means of which, on the one hand, the brake pad units are prevented from accompanying the movement of the brake disc and, on the other hand, prevents the end portions of the actuators from being entailed in rotational movements of the actuators when adjusting for the gradual wear of the brake pad units.

Said object is achieved by means of the device according to the present invention, the characterising features of which are evident from the subsequent claim 1.

By means of the device according to the invention, the brake pad units are kept in position so that, on the one hand, they cannot leave their main position in the brake yoke when worn out and, on the other hand, end portions of the actuators are maintained in a non-rotaable position in relation to the brake pad units.

DESCRIPTION OF THE DRAWINGS:

The invention will be described in the following in greater detail with reference to an embodiment and to the attached drawings in which:

FIG. 2 shows two brake pad units according to the invention with associated coupling members, while

FIG. 1 shows a brake yoke 1 of a so called floating type, which thereby creates an extremely symmetrical force action on the portion of the brake disc 3 which protrudes into a recess 2, as indicated by dotted lines. The brake disc is in a conventional way firmly attached to a wheel hub for rotation together with a vehicle wheel of a motor vehicle, for instance a heavy vehicle, such as a goods vehicle. This symmetrical force action is achieved by means of the yoke being slidable in parallel to the axis of rotation of the brake disc 3, in a not shown, conventional manner. A brake pad unit 4, 5 is arranged on each of the two sides 6, 7 of the brake disc, whereby in the shown example actuators, more exactly two 8, 9, are arranged only on one side for direct action against the outside 10 of one of the brake pad units. On one side of the brake pad unit, a brake pad 11 is arranged in a conventional manner, with a frictional surface which, when in a braking position, is intended to be pressed against the sides of the brake disc by means of the actuators 8, 9 while, when in a passive off-position, it is intended to be returned into a position in which the brake pads 11 are situated a small distance from the brake disc. In itself, the yoke does not have to be of a floating type, whereby two actuators are also arranged on the opposite side of the yoke, on the outside of the brake pad unit 4. In the shown example, the brake pad units 4, 5 are designed as steel plates with frictional linings on one side, but may also be designed as a homogenous unit of a frictional material.

Figure 1:
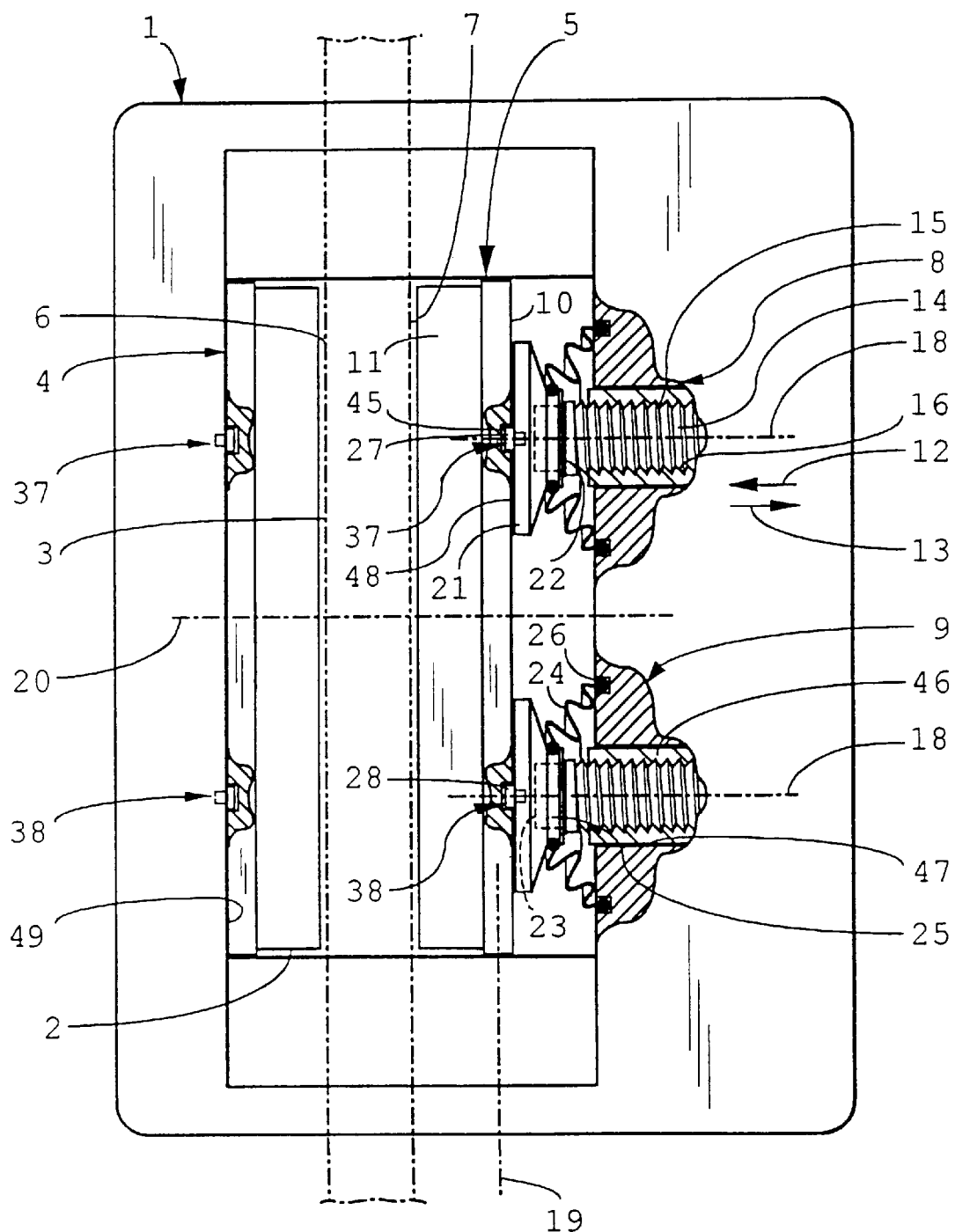
FIG. 1 shows a brake yoke provided with the device according to the present invention, in a partially sectioned side view.

The actuators 8, 9 are of a mechanical type, whereby their linear, reciprocating movement between braking position and passive position, in the direction of the arrows 12 and 13, is achieved by means of linear displacement of a piston 46, which is linearly movable in a bore 47 in the yoke. The piston 46 exhibits the shape of a sleeve into which a screw 14 with an external thread 15 extends, interacting with an internal thread 16. The piston in the bore 47 extends along a longitudinal axis 18 transverse and essentially perpendicular to the main plane 19 of the brake pad units and, consequently, essentially parallel to the axis of rotation 20 of the brake disc 3. The movement of the pistons 46 may be achieved in a, per se, previously known way by means of, for instance, a pneumatic brake system which is typical for heavy vehicles. The purpose of the rotational movement of the screws 14 in the two actuators 8, 9 is to gradually adjust the position of the actuators as the brake pads and the brake disc are worn, and this may also be done in a previously known way.

The torsional movement of the screw 14 of the actuators, however, should not be transferred to the brake pad unit 5, and therefore the actuators are, in a conventional way, provided with a head 21 in their end facing towards the brake pad unit 5. The heads 21 are pivotally journalled on the associated screw by means of a simple pivot bearing 22, which for instance may be designed as a rotationally symmetric, for instance cylindrical, pivot 23 which intrudes into a correpondingly designed recess in the head 21 of the actuator 8. A bellows 24, made of for instance rubber, which is expansible in the principal direction of movement of the actuators and therefore does not have to receive any torsional movements, is arranged as a dirt cover between the head and the yoke. Therefore, the bellows may at one of its ends be relatively firmly attached with a circumferential surface 25 to the head 21, and at its other end be firmly attached to a groove 26 which extends around the actuator and is arranged in the yoke 1. The bellows are advantageously designed with reinforcement beads at their attachment sites which, consequently, are not intended to allow any sliding movement.

The heads 21 on the actuators 8, 9 exhibit power-transferring pressure surfaces 48 which, in the shown example, are essentially planar and intended to interact with the side of the brake pad unit 10, which also is essentially planar and facing towards the actuators. The actuators are situated at a carefully adapted relative distance from the two ends of the brake pad units in order to provide a uniformly distributed power transmission across the brake pad unit 5.

Figure 2:
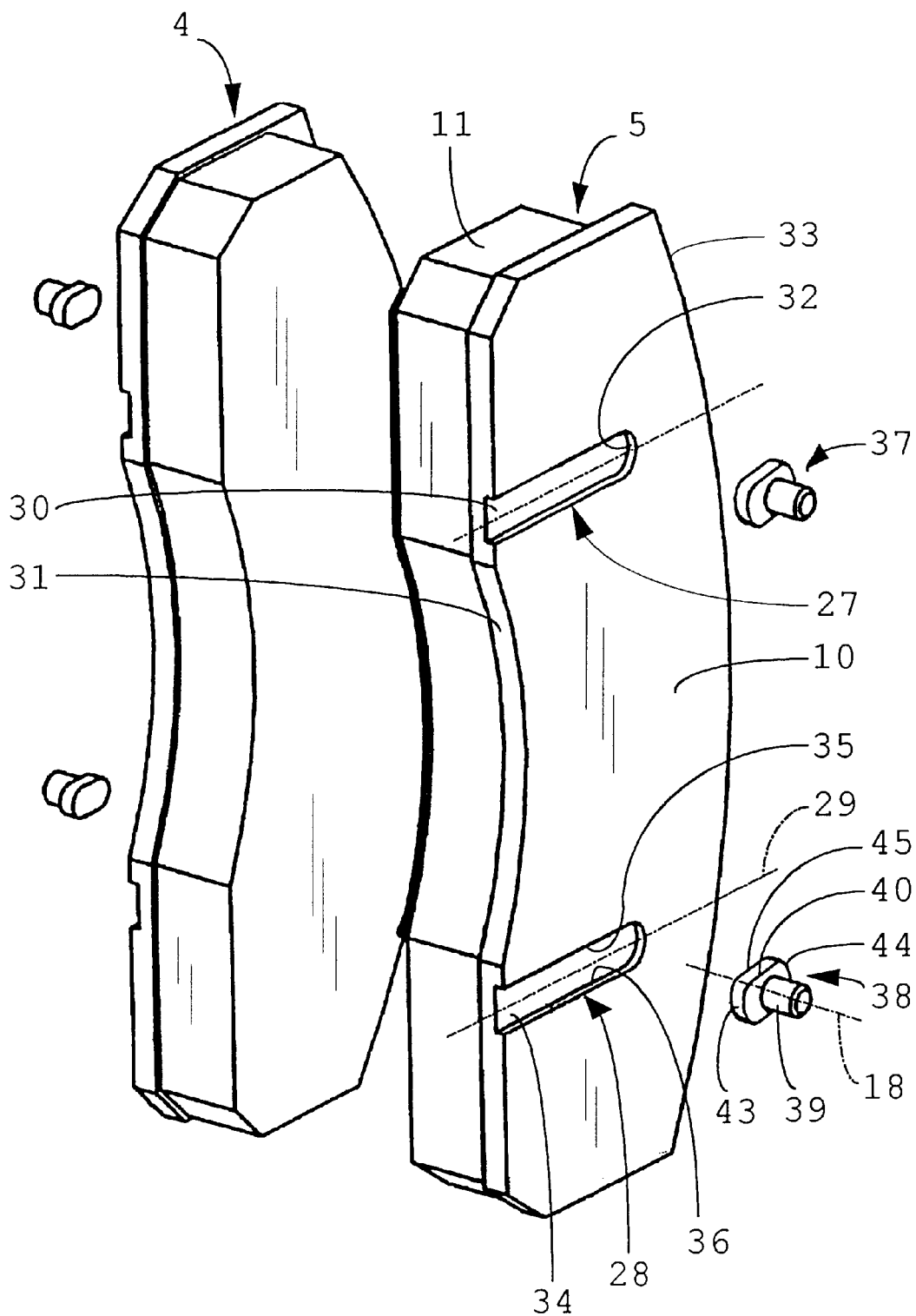
Figure 3:
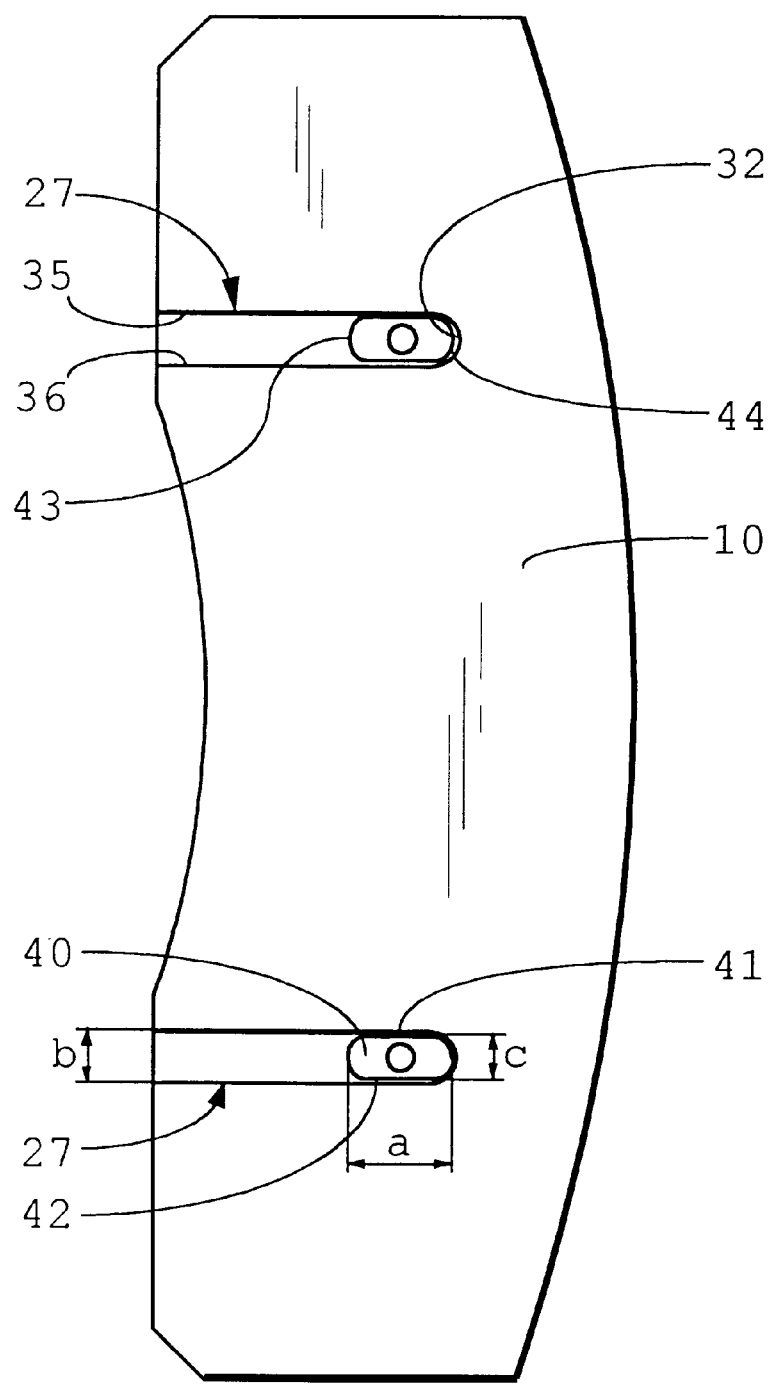
FIG. 3 shows a side view of a brake pad unit according to the invention with associated coupling members.

As is evident from FIG. 1 as well as FIG. 2 and FIG. 3, both brake pad units exhibit coupling and guiding means 27, in the further description, for reasons of simplicity, denoted coupling members, for relative positioning of the brake pad units 4, 5 and of the heads 21 of the actuators 8, 9. According to the shown example, the coupling members 27, 28 are designed as grooves in the sides 10 of the brake pad units 4, 5, which are situated opposite the brake linings 11. The grooves are situated so that they extend level with the ends of the actuators, i.e. their heads 21, so that the longitudinal symmetry axis 29 of the grooves crosses the longitudinal axis 18 of the actuators essentially at 90°, i.e. their direction of action.

More exactly, the grooves 27, 28 with their one end 30 emerge at the radially inner edge portion 31 of the brake pad units and terminate at their opposite end 32 at a distance from the radially outer edge portion 33 of the brake pad units 4, 5. The grooves 27, 28 exhibit an essentially U-shaped cross-section with a bottom 34, which is essentially planar in the shown example, and two opposite edge portions 35, 36, which in the shown example are essentially perpendicular to the bottom and accordingly to the side 10 of the brake pad units 4, 5, and extend mutually in parallel and at the end 32 merge into a rounded, for instance arc-shaped, portion in the shown example. This portion may in itself be designed as a planar, transverse or V-shaped edge portion.

According to the invention, the actuators 8, 9 at their ends, more exactly in the centre of their heads 21, also exhibit coupling members 37, 38 for interaction with the coupling members 27, 28 of the brake pad units for said relative positioning and guiding. In the shown example, the coupling members 37, 38 of the actuators are designed as pins. Each pin has an attachment portion 39 which is inserted into the head 21 of the actuator by means of, for instance, press-fitting so that a protuberance 40, specially designed according to the invention, protrudes from the pressure surface 48 on the actuators 8, 9.

According to the invention, the coupling members 37, 38 associated with the actuators are not rotationally symmetric around their longitudinal axis, which corresponds to the main axis 18 of the actuators, when the protuberances 40 are concerned, but these are designed with two opposing, elongate guiding surfaces 41, 42 which, in the shown example, are linear and extend parallel relative to each other and exhibit a relative distance which is adapted to the width of the grooves 27, 28, i.e. the relative space between the longitudinal edge portions 35, 36 of the grooves. In practice, the relative distance between the edge portions 41, 42 is essentially of the same magnitude as the width of the grooves and in practice somewhat below, in order to cooperate with the guiding edges of the grooves with reasonable manufacturing tolerances. The tolerances may not be so large that a relative nip action may occur by means of the pins being turned. Seen in a plane essentially parallel to the side 10 of the brake pad units 4, 5, the protuberances 40 have such an extension a in a direction deviating from the direction of the width c direction, e.g. in the longitudinal direction of the grooves 27, 28, i.e. in the direction of the axis 29, such that it exceeds the width of the grooves, i.e. a is larger than b, in this example, and as is realized according to the above, b is larger than c. In the shown example, the protuberances 40 are designed with rounded end portions 43, 44, in the shown example with an arc-shape which is adapted to the shape of the ends 32 of the grooves 27, 28.

As is most clearly evident from FIG. 1, the longitudinal edge portions 41, 42 of the protuberances 40 extend, in the shown example, perpendicularly outwards from the pressure surface 48 and thereby also merge in the depth direction with the extension of the grooves 27, 28 in the depth direction. It is also evident that the extension in depth direction of the protuberances is in practice equal to or slightly smaller than the depth of the grooves, whereby the front surface 45 of the protuberances, which in the shown example is planar, does not form a pressure surface but in practice exhibits a distance to the bottom 34 of the grooves so that the pressure forces of the actuators are transformed directly from the pressure surface 48 of the head 21, directly to the side 10 of the brake pad unit 5. The extension of the protuberances 40 in the depth direction, however, should be so large that the protuberances do not leave the grooves 27, 28 during the retraction of the actuators to a passive position. Therefore, the extension of the protuberances 40 in the depth direction should not be smaller than the normal stroke of the actuators, which in practice is very small.

Thus, in the shown example, there are no actuators on the opposite side of the brake disc 3. Nevertheless, the positioning of the brake pad units 4 is still done in an analogous way. In this case, the coupling members 37, 38 are arranged directly in the wall 49 of the yoke and, accordingly, are firmly and non-pivotally mounted in order to provide a safe positioning of the brake pad units 4, which in a corresponding way are provided with the above-described guiding grooves 27, 28.

By means of the above-described arrangement with the coupling members according to the present invention, a positioning of the brake pad units 4, 5 consequently takes place on both sides of the brake disc 3, whereby, when actuators 8, 9 are present, a relative positioning takes place. Consequently, the object which is solved by the coupling members 27, 28, 37, 38, on both sides of the yoke, is the holding of the brake pad units 4, 5 so that they are not carried with the rotation of the brake disc 3, in the case of an extremely worn brake disc and worn brake pads 11. This is achieved by means of the guiding surfaces 41, 42 of the pins 37, 38 being brought in contact with the guiding surfaces 35, 36 of the grooves 27, 28, both in braking position and in an off-position. Since the stroke of the actuators, when switching between braking position and off-position is so small, the retaining is maintained in spite of the insignificant extension of the pins in depth. In a conventional way, an adaptation of the position of the actuators 8, 9 gradually occurs, by means of a screwing movement of the screw 14, to the wear of the brake pads and the brake disc developed as time goes by, whereby the head 21 of the actuators is kept in close contact with the side 10 of the brake pad unit 5 all the time. The coupling members, however, do not have any active retracting function or action on the brake pad unit 5. Neither is it possible since, when the braking pressure is discontinued, i.e. the pressure from the pressure surfaces 48 of the actuators ceases and the actuator with its small movement is retracted, it is ensured by means of the movement of the brake disc that the brake pads are not in contact with the brake disc and become worn out in a passive position, i.e. non-braking position.

By means of the coupling members 27, 28, 37, 38 it is in addition ensured that the head 21 of the actuators 8, 9 is kept non-pivotally attached to the brake pad 5 in all positions of the actuators. This is achieved by means of the non-circular shape of the coupling members 37, 38, or more exactly by means of the protuberances 40 having an extension, in any direction deviating from the transverse direction of the grooves 30, 34, which exceeds the width of the grooves. Also in this case, the guiding surfaces 41, 42 of the protuberances 40 serve as guiding and contact surfaces, against the guiding surfaces 35, 36 of the grooves 30, which prevent torsional tendencies, arising from friction between the head 21 and screw 14. In this manner, there is no detrimental deformation of the bellows 24, which acquire a long working life, whereby the risk of breakdown, because of defilement and corrosion in the actuators 8, 9, is minimized. Furthermore, by means of the design of the coupling members, the risk that the brake pad units are inserted in the wrong way, with serious damage to the brake disk as a consequence, is eliminated.

The invention is not limited to the embodiments described above and shown in the drawings, but may be varied within the scope of the subsequent claims. The coupling members 37 may, for instance, be designed in another way. It is, for instance, conceivable that the extension of the protuberance in its length direction, in itself, may be equal to the width of the grooves. For instance, the protuberances may be square, whereby their extension in at least some direction exceeds the width of the groove, whereby a torsional locking is brought about.

I claim:

1. A disc brake arrangement for motor vehicles, comprising at least two brake pad units supported by a brake yoke, one side of each said at least two brake pad units comprising a frictional surface, which is arranged to face a rotatable brake disc and the other side of said at least two brake pad units which is arranged to face an actuator, whereby, when in a position for braking the vehicle, each brake pad unit is arranged to be brought into an active position by means of at least two actuators acting against said other side of each said at least two brake pad units and to be allowed to be returned to a retracted, passive position, whereby each actuator comprises an end portion which is intended to transfer to each said at least two brake pad units movement of said at least two actuators towards and from said other side of said at least two brake pad units, which on said other side of said at least two brake pad units comprises a first coupling means arranged for each actuator, whereby each actuator end portion comprises second coupling means arranged for positioning of said at least two brake pad units, said adjustment device exhibits a screw rotatable in each actuator, said screw in its end facing the brake pad unit, a pivot bearing, supporting said end portion of the acutators, whereby a protective bellows may be mounted between said end portion and the brake yoke, both said first and second coupling means comprises interacting guiding surfaces, which are arranged to prevent rotation of each end portion of the actuators about an axis, transverse to said other side of said at least two brake pad units.

2. The device according to claim 1, wherein said first coupling means is comprised of grooves with an essentially U-shaped cross-section and that said second coupling means is comprised of protuberances which are arranged to extend into the grooves and comprise, as seen in a plane essentially parallel to the side of the brake pad unit, a dimension (c) which, in the transverse direction of the grooves, is somewhat smaller than the transverse dimension of the grooves (b), and which, in a direction deviating from the transverse direction, exceeds the transverse dimension of the grooves.

3. The device according to claim 2, wherein the grooves extend in parallel and that each of them comprises two parallel edge portions which form said interacting guiding surfaces of said first coupling means.

4. The device according to claim 3, wherein said edge portions extend from the bottom of the grooves with an essentially planar surface perpendicular to the side of the brake pad unit.

5. The device according to claim 4, wherein the grooves comprise an end which emerges at one edge portion of the brake pad unit, and an opposite end (32) which is situated at a distance from the opposite edge portion (33) of the brake pad unit.

6. The device according to claim 1, wherein said protuberances are arranged on said end portion of at least two actuators, protruding from a pressure surface to a height which is equal to or smaller than the depth of said groove.

* * * * *

UNITED STATES PATENT AND TRADEMARK OFFICE
CERTIFICATE OF CORRECTION

PATENT NO. : 6,073,732
DATED : June 13, 2000
INVENTOR(S) : Angerfors

Page 1 of 1

It is certified that error appears in the above-identified patent and that said Letters Patent is Column 1,
Line 19, delete ",".

Column 4,
Line 9, after "width" insert -- b --.

Column 5,
Line 43, delete ",".

Column 6,
Line 10, after "units," insert -- and including --.
Line 11, delete "said adjustment device exhibits".
Line 13, delete ",".
Line 15, after "both" insert -- of --.
Line 16, "comprises" should read -- comprising --.
Line 18, delete ",".
Line 40 delete "(32)".
Line 41 delete "(33)".

Signed and Sealed this

Eighteenth Day of September, 2001

*Attest:*

NICHOLAS P. GODICI
*Attesting Officer*    *Acting Director of the United States Patent and Trademark Office*